Feb. 10, 1953
F. M. NASH ET AL
2,627,942
UNDERGROUND VEHICLE PARKING ELEVATOR
Filed Aug. 19, 1949
4 Sheets-Sheet 1
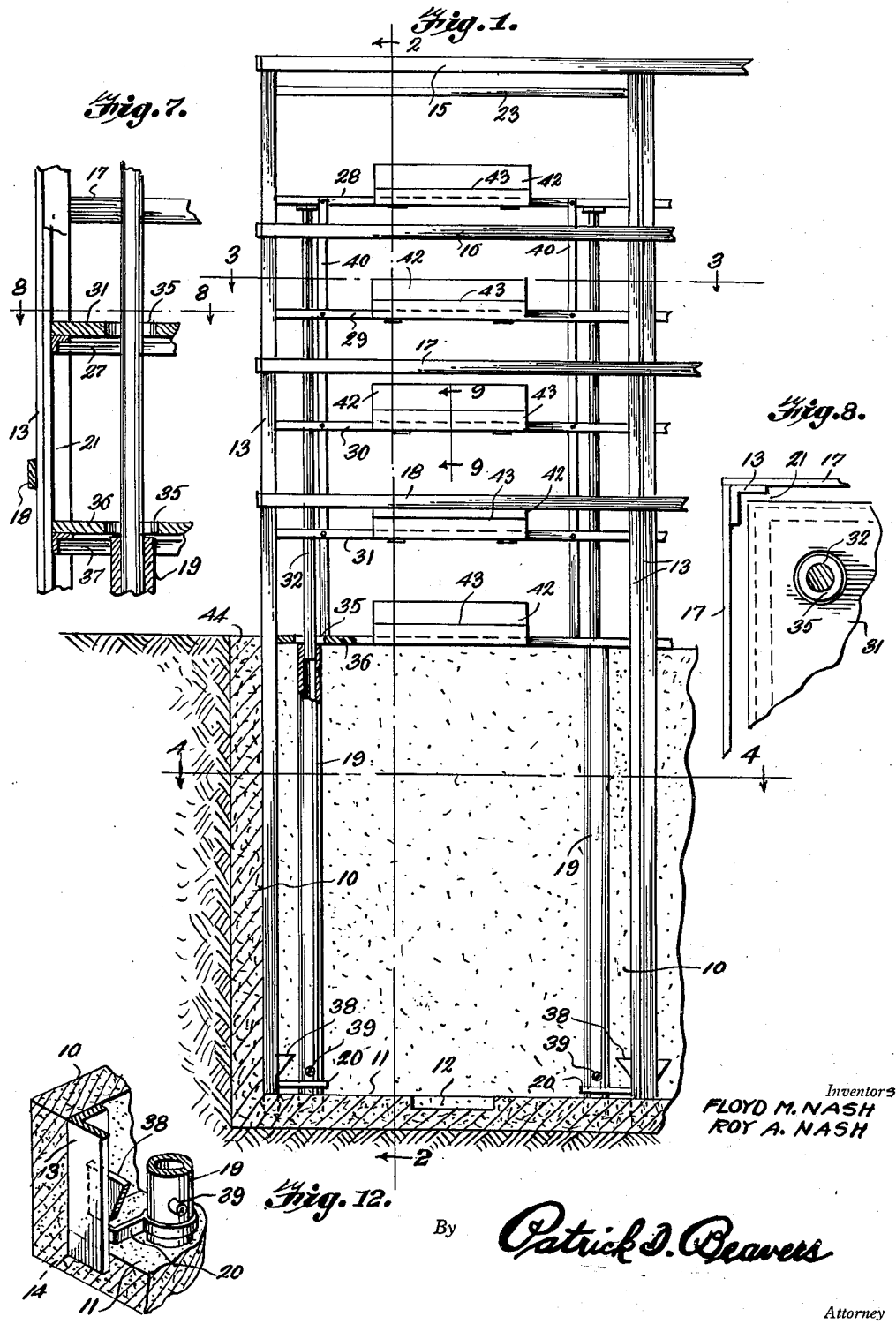
Inventors
FLOYD M. NASH
ROY A. NASH
By Patrick D. Beavers
Attorney Feb. 10, 1953    F. M. NASH ET AL    2,627,942
UNDERGROUND VEHICLE PARKING ELEVATOR
Filed Aug. 19, 1949    4 Sheets-Sheet 2
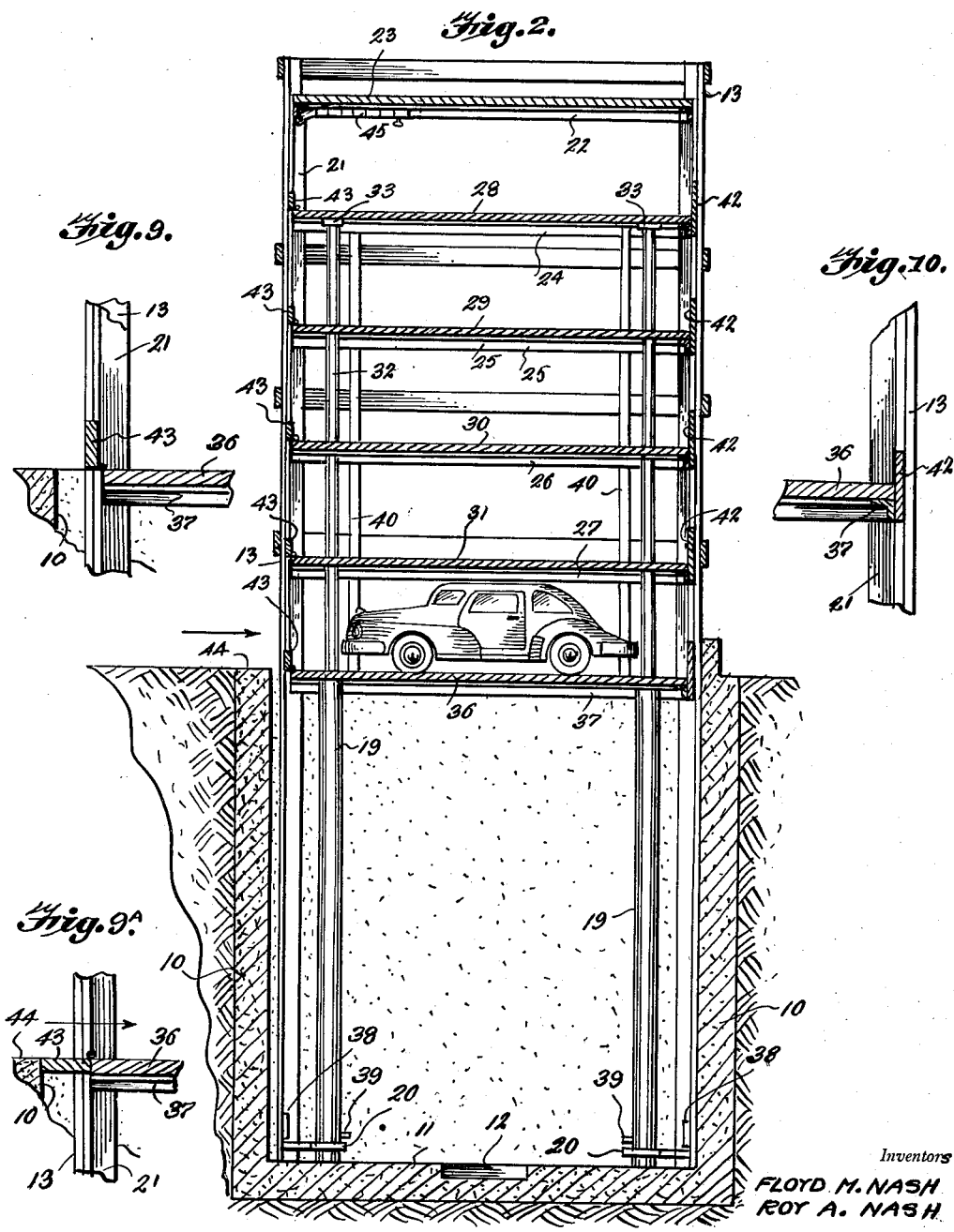
Inventors
FLOYD M. NASH
ROY A. NASH
By Patrick D. Beavers
Attorney

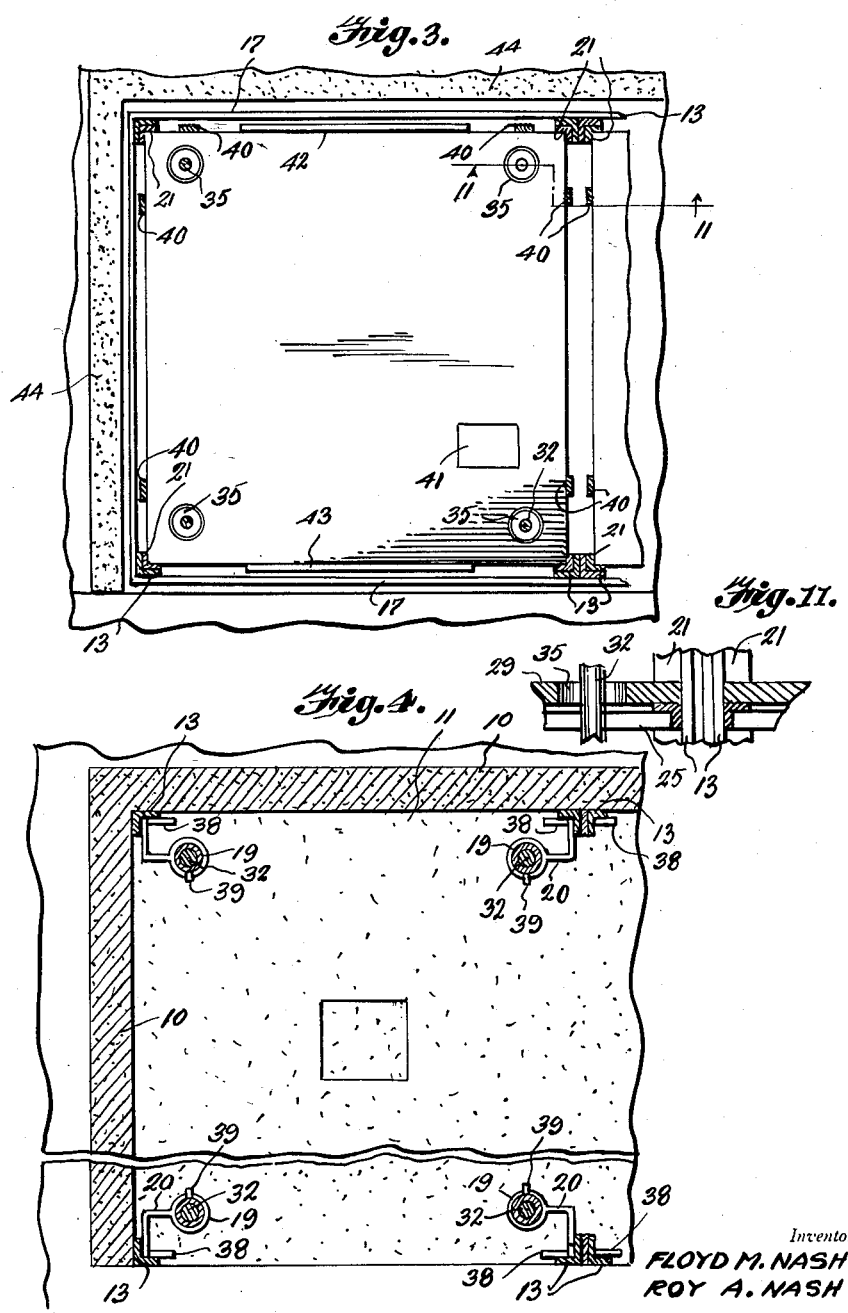

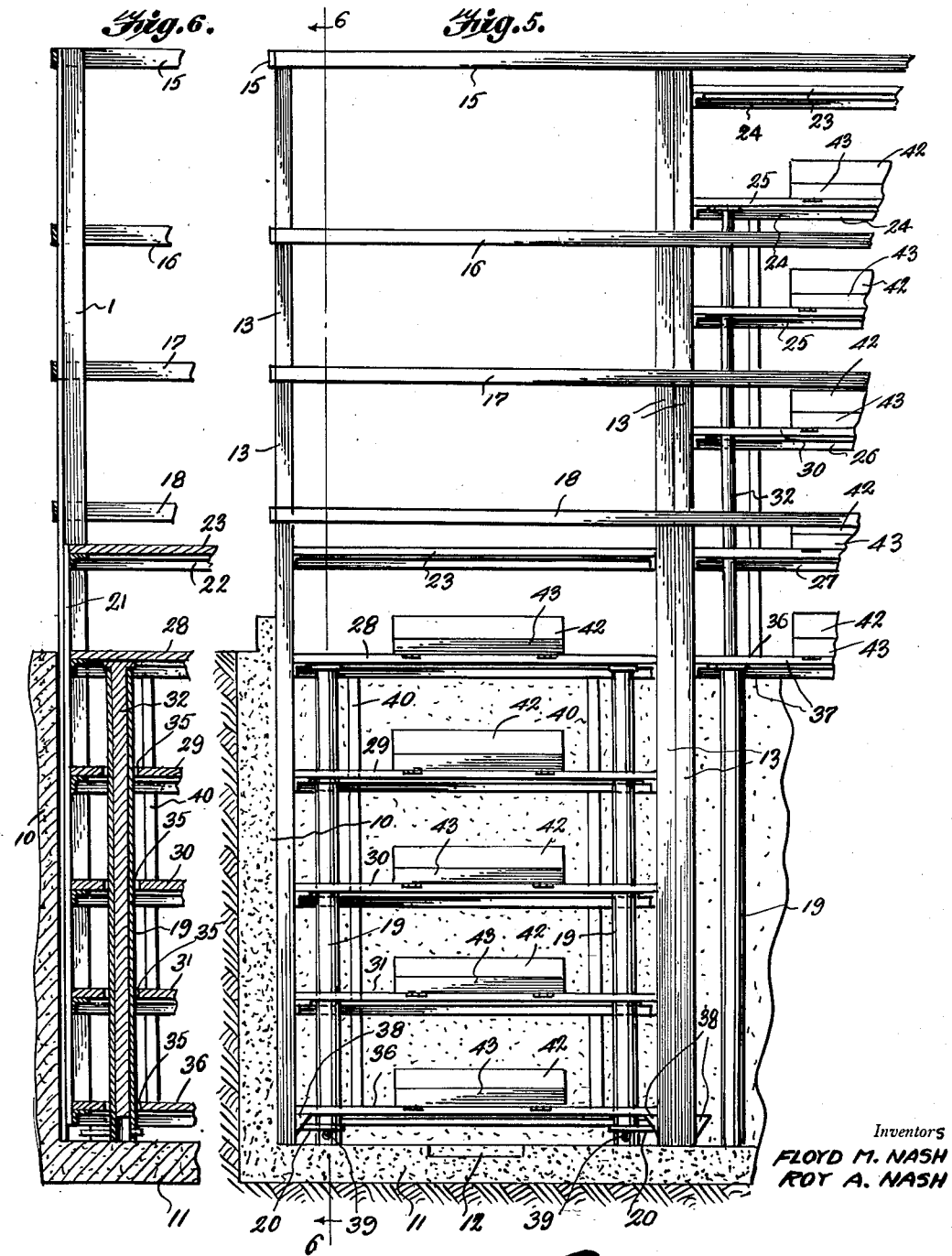

Patented Feb. 10, 1953

2,627,942

UNITED STATES PATENT OFFICE 2,627,942

UNDERGROUND VEHICLE PARKING ELEVATOR

Floyd M. Nash and Roy A. Nash, Bluefield, W. Va.

Application August 19, 1949, Serial No. 111,222

1 Claim. (Cl. 187—1)

The present invention relates to underground vehicle parking elevators and it consists in the combinations, constructions and arrangements of parts herein described and claimed.

Generally there is provided an elevator for parking automobiles and other vehicles and it comprises a well or shaftway in which is erected a framework in which is mounted a vertically movable multi-floored elevator. Air pressure operated means is provided for moving the elevator and novel means is provided for bridging the gap between any given floor of the elevator and the ground adjacent the structure. Novel means is provided for bracing various elements of the structure and for keeping the well in a dry condition. Other novel features will be brought out in the detailed description of the invention.

It is accordingly an object of the invention to provide a structure of the character set forth which is simple and relatively inexpensive in construction and yet efficient and effective in use.

Another object of the invention is the provision of a structure of the character set forth wherein all the floor space of the elevator is available at all times for the parking of vehicles.

Another object of the invention is the provision, in an apparatus of the character set forth, of novel means for excluding rain and snow from vehicles stored therein.

A further object of the invention is the provision, in an apparatus of the character set forth of a novel arrangement of trap doors in the floors of an elevator forming a part of the invention.

Still another object of the invention is the provision of novel means for motivating an elevator forming a part of the invention.

Another object of the invention is the provision, in an apparatus of the character set forth, of novel swingable bridges forming a part of the invention.

Another object of the invention is the provision of a structure of the character set forth in which a housing building for protecting the same is unnecessary.

A still further object of the invention is the provision of novel means for bracing certain elements of the invention.

Other and further objects of the invention will become apparent from a reading of the following specification taken in conjunction with the drawings, in which:

Figure 1 is a front elevational view of an embodiment of the invention,

Figure 2 is a sectional view taken along line 2—2 of Figure 1,

Figure 3 is a sectional view taken along line 3—3 of Figure 1,

Figure 4 is a sectional view taken along line 4—4 of Figure 1,

Figure 5 is a view similar to Figure 1 but showing the elevator therein in lowered position, Figure 6 is a fragmentary vertical sectional view taken along line 6—6 of Figure 5, Figure 7 is an enlarged fragmentary vertical sectional view illustrating certain details of construction, Figure 8 is a sectional view taken along line 8—8 of Figure 7, Figure 9 is an enlarged sectional view taken along line 9—9 of Figure 1, Figure 9A is a view similar to Figure 9 but showing the bridge therein in lowered position, Figure 10 is a fragmentary sectional view illustrating certain details of construction, Figure 11 is an enlarged sectional view taken along line 11—11 of Figure 3, and Figure 12 is a fragmentary perspective view illustrating certain elements of the invention.

Referring more particularly to the drawings, there is shown therein an elevator well having vertical side walls 10 of relatively thick concrete construction and a well floor 11 contiguous thereto and likewise formed of relatively thick concrete. Centrally disposed in the well floor 11 is a recess 12.

A frame is provided and consists of a vertically extending member 13 of angle iron mounted in each corner of the well and extending into the floor 11, as indicated at 14, in Figure 12. The upper ends of the vertical frame members 13 are interconnected by cross bars 15 and are further interconnected by cross bars 16, 17 and 18 which are mounted in spaced relation to the top cross bar 15.

Adjacent each corner of the elevator well is a hydraulic cylinder 19 which extends upwardly to a point immediately below ground level and which is connected adjacent its lower end with an adjacent vertical frame member 13 by means of a reinforcing bracket 20.

An elevator is provided and consists of four vertical frame members 21 each slidably mounted within an adjacent vertical frame member 13 and to the upper ends of which are connected horizontally extending elevator cross bars 22 for the support of a roof 23 for the elevator.

In spaced relation from the roof 23 and interconnecting the vertical elevator frame members 21 are groups of cross bars 24, 25, 26 and 27 which are formed of angle iron and which extend inwardly to support floors 28, 29, 30 and 31.

In each of the hydraulic cylinders 19 is slidably mounted a rod 32, the upper end of which is received in a socket member 33 affixed to the underside of the floor 28. Openings 35 are provided in each of the floors 29, 30 and 31 as well as in a bottom floor 36 for the passage therethrough of the cylinder 19 when the elevator is lowered. The floor 36 is supported upon cross bar members 37 which are, in turn, affixed to the vertical elevator frame members 21.

Stop members 38 are welded or otherwise affixed to the vertical members 13 in spaced relation from the bottom of the elevator well and hydraulic connections 39 are provided for the cylinders 19 adjacent the lower ends thereof.

The elevator frame is provided also with vertically extending brace members 40 which are spaced from the corners of the elevator frame and which interconnect the cross bars 24, 25, 26 and 27 and 37.

A trap door 41 is provided in each of the floors 28, 29, 30, 31 and 36.

Affixed to the cross bars 25, 24, 26, 27 and 37 at the central portions of the rear side thereof is a bumper guard 42 and to the forward edge of the floors 28, 29, 30, 31 and 36 is pivotally connected a draw bridge 43 which is adapted, when lowered, to bridge the space between the front edge of the floor and the inner edge of a narrowed portion 44 formed in the upper edge of the wall 10 and which narrowed portion 44 has its upper surface lying flush with the ground level. A door 45 is mounted upon the under side of the roof 23 and is adapted to close the space between the roof 23 and the floor 28 at the front end thereof when in lowered position.

In operation, it will be apparent that in order to raise the elevator hydraulic fluid is introduced under pressure into the conduits 39 through conventional means thereby forcing the plunger rods 32 upwardly from the cylinders 19 to thereby raise the elevator. Suitable controls for the hydraulic fluid will, of course, be provided at a convenient point upon the ground level so that the operator may bring any one of the floors 28, 29, 30, 31 or 36 level with the ground at will. To lower the elevator it is only necessary to relieve the pressure in the cylinders 19 to thereby allow the descent of the rods 32 into the cylinders 19.

When the desired floor has been brought level with the ground the drawbridge 43 connected with that particular floor may be lowered to a horizontal position thus bridging the space between the elevator proper and the walls of the well. The drawbridges 43 may be moved upwardly to vertical position when not needed. The stop members 38 are provided for limiting the downward movement of the elevator and it will be seen that the lowermost cross bars 37 will come to rest upon the stop members 38 when the elevator is so lowered.

When the elevator is in its lowermost position a working space still remains between the floor 36 and the floor 11 of the well and access may be had to this space from any floor of the elevator by means of the trap doors 41. The recess 12 is provided to collect whatever water may accumulate in the bottom thereof in the elevator well and suitable pumping means may be provided for moving such accumulated water to a point without the well.

It will also be apparent that while but one unit has been described herein that several units may be mounted side by side as shown, for example, in Figure 5 of the drawings.

The bumper guards 42 at the rear of each floor of the elevator act to prevent a vehicle upon that floor from passing beyond the rearward limits of the floor. When the elevator is in its lowermost position, it will be seen that the roof 23 is at a height of one floor above ground level and that the door 45 may then be lowered to form a closure for the front of the apparatus. The outer framework may be provided with suitable covering if so desired.

While but one form of the invention has been shown and described herein, it will be readily apparent to those skilled in the art that many minor modifications may be made without departing from the spirit of the invention or the scope of the appended claim.

What is claimed is:

An apparatus of the character described comprising a rectangular elevator well, a framework mounted in the bottom of the well and extending a distance above ground level, a multi-floored elevator vertically movable in the framework, a plurality of vertically extending cylinders mounted in the bottom of said well, a piston rod extending upwardly from each cylinder, and a plurality of sockets affixed to the underside of the uppermost floor and each adapted to receive the upper end of a piston rod therein, said remaining floors each provided with openings each adapted to receive therethrough one of said cylinders and its associated piston when said elevator is lowered.

FLOYD M. NASH.
ROY A. NASH.

REFERENCES CITED

The following references are of record in the file of this patent:

UNITED STATES PATENTS

| Number | Name | Date |
|---|---|---|
| 80,445 | Brand | July 28, 1868 |
| 1,136,604 | L'Heureux | Apr. 20, 1915 |
| 1,539,286 | Norman | May 26, 1925 |
| 1,781,753 | Flannery | Nov. 18, 1930 |
| 1,896,362 | Holmes | Feb. 7, 1933 |
| 1,906,773 | Scott | May 2, 1933 |
| 1,977,706 | Watts | Oct. 23, 1934 |
| 2,223,962 | Mitchell | Dec. 3, 1940 |
| 2,233,055 | Kennedy | Feb. 25, 1941 |
| 2,242,891 | Light | May 20, 1941 |
| 2,473,127 | Alexander | June 14, 1949 |